US007578094B2

(12) United States Patent
Rogers et al.

(10) Patent No.: US 7,578,094 B2
(45) Date of Patent: Aug. 25, 2009

(54) DRIVE UNIT FOR POWER OPERATED VEHICLE CLOSURE

(75) Inventors: Lloyd W. Rogers, Shelby Township, MI (US); Jeffrey S. Hamminga, Warren, MI (US); Joseph D. Long, Waterford, MI (US); Joseph M. Johnson, Huntington Woods, MI (US)

(73) Assignee: Strattec Power Access LLC, Glendale, WI (US)

( * ) Notice: Subject to any disclaimer, the term of this patent is extended or adjusted under 35 U.S.C. 154(b) by 1221 days.

(21) Appl. No.: 10/379,785

(22) Filed: Mar. 5, 2003

(65) Prior Publication Data

US 2004/0172883 A1 Sep. 9, 2004

(51) Int. Cl.
*E05F 15/00* (2006.01)
*E05F 11/24* (2006.01)
*F16H 29/02* (2006.01)

(52) U.S. Cl. ............................ 49/138; 49/339; 49/340; 49/341; 74/89.2; 74/89.33; 296/56; 296/146.8

(58) Field of Classification Search .................. 49/138, 49/339, 340, 341; 74/89.2, 89.21, 89.22, 74/89.23, 89.32, 89.33; 296/56, 146.8
See application file for complete search history.

(56) References Cited

U.S. PATENT DOCUMENTS 3,406,484 A * 10/1968 Atkey et al. ................... 49/363
5,588,258 A * 12/1996 Wright et al. ................. 49/340
5,992,259 A * 11/1999 Fleytman ..................... 74/425
6,092,336 A * 7/2000 Wright et al. ................. 49/339
6,135,536 A 10/2000 Ciavaglia et al.
6,185,868 B1 * 2/2001 Kato ........................... 49/339
6,367,199 B2 4/2002 Sedlak et al.
6,367,864 B2 4/2002 Rogers, Jr. et al.
6,378,392 B1 4/2002 Dombrowski et al.
6,398,288 B1 * 6/2002 Yuge ....................... 296/146.4
6,550,839 B2 4/2003 Rogers, Jr. et al.
6,588,151 B1 7/2003 Goscicki et al.
2003/0136054 A1 * 7/2003 Daniels et al. ................ 49/340

FOREIGN PATENT DOCUMENTS

| | | |
|---|---|---|
| EP | 1235330 | 8/2002 |
| GB | 2338028 | 12/1999 |
| JP | 58-221053 | * 12/1983 |
| WO | WO 01/83247 A2 | 11/2001 |

* cited by examiner

*Primary Examiner*—Katherine W Mitchell
(74) *Attorney, Agent, or Firm*—Michael Best & Friedrich LLP

(57) ABSTRACT

A drive unit for a power operated vehicle closure has a track, a guide moveable along the track, a link attached to the guide at one end and adapted to be attached to the vehicle closure at the opposite end, and a motor assembly for moving the guide along the track. The motor assembly has an electric motor and a speed reducer driven by the electric motor that has a first stage and a second stage. The first stage includes a belt drive and the second stage is a spur gear set. Alternatively the first stage is a worm gear and a mating helical gear. The worm gear preferably has a high lead angle and a high number of leads. The speed of the electric motor is reduced to about 1000 rpm or less in the first stage permitting the use of spur gears in the second stage while retaining quiet operation.

4 Claims, 7 Drawing Sheets

DRIVE UNIT FOR POWER OPERATED VEHICLE CLOSURE

TECHNICAL FIELD

This invention relates generally to a power operated vehicle closure and more particularly to a drive unit that is installed in a motor vehicle to power open and close a vehicle closure such as a lift gate, deck lid, or the like.

BACKGROUND OF THE INVENTION

U.S. Pat. No. 6,367,864 B2 granted to Lloyd Rogers, Jr. et al. Apr. 9, 2002 discloses a power operated lift gate that has at least one power unit for raising and lowering the lift gate. The power unit comprises a fixed linear guide channel and a follower that moves in the guide channel. The follower is universally connected to one end of a rod that has an opposite end universally connected to the lift gate. The follower is moved in the guide channel by a flexible drive member that is attached to the follower and that is driven in a loop by a bi-directional drive unit. The drive unit includes a bidirectional electric motor, an electromagnetic clutch and suitable gear sets that are not described in detail. The flexible drive member may be a chain, a drive cable or a slotted drive tape. The electromagnetic clutch is optional and normally deenergized so that the lift gate can be opened and closed manually without the necessity of back driving the electric motor.

U.S. Pat. No. 6,367,199 B2 granted to David A. Sedlak et al. discloses a power operated lift gate that has a power unit in which the follower is a rack bar that is driven directly by a bi-directional drive unit. The rack bar is universally connected to one end of a rod that has an opposite end universally connected to the lift gate. The drive unit includes a bi-directional electric motor that has a worm gear output that drives a first gear set. The first gear set in turn drives an electromagnetic clutch which drives a second gear set that drives the rack bar. The electromagnetic clutch is normally de-energized so that the lift gate can be opened and closed manually without the necessity of back driving the electric motor.

Published International Patent Application WO 01/83247 A2 of Atoma International Corp. discloses a power operated lift gate in which a slideable lift gate carriage 40 is selectively latched to a power guide carriage 50 for power operation. The power guide carriage 50 is moved by a flexible drive member 64 that travels in a loop. The flexible drive member 64 is driven by a bi-directional electric motor 58 which drives a transmission gear 60 via a gear box (unnumbered). The gear set in the gear box is not described in detail. The lift gate carriage 40 is normally unlatched from the power guide carriage 50 so that the lift gate can be opened and closed manually without back driving the electric motor.

As illustrated above, power operated lift gates are normally raised and lowered by an electric motor that operates some sort of mechanism via one or more gear sets. The gear sets reduce the speed of the electric motor which is usually in excess of 3000 rpm to about 30 rpm so that the lift gate is opened or closed at a speed of about 9-13 degrees per second. This requirement for considerable speed reduction of about 12 to 1 generates two needs or desirable characteristics for the drive unit. The primary desire or need is for a quiet and economical speed reduction on the order of 12 to 1. The secondary desire or need is to operate the lift gate manually and preferably without including an electromagnetic clutch or other device to disconnect the electric motor to eliminate back drive.

SUMMARY OF THE INVENTION

The invention provides a drive unit that has an electric motor while being very compact, economical and quiet. The drive unit uses a two stage speed reducer in which the first stage reduces the speed to about 1000 rpm or less so that the second stage can make use of spur gears which are very economical but noisy above about 1000 rpm. The first speed reducer may be belt driven which is economical and very quiet. Alternatively the first speed reducer may be a worm gear that has a high lead angle and high number of leads and that drives a helical gear. This speed reducer is not only quiet but also very compact. In either event, the speed reducer is such that the electric motor can be back driven through the speed reducer without any need for an electromagnetic clutch or other disconnect device to permit manual opening and closing of the lift gate.

BRIEF DESCRIPTION OF THE DRAWINGS

The present invention will now be described, by way of example, with reference to the accompanying drawings, in which.

DETAILED DESCRIPTION OF PREFERRED EMBODIMENTS

Figure 1:
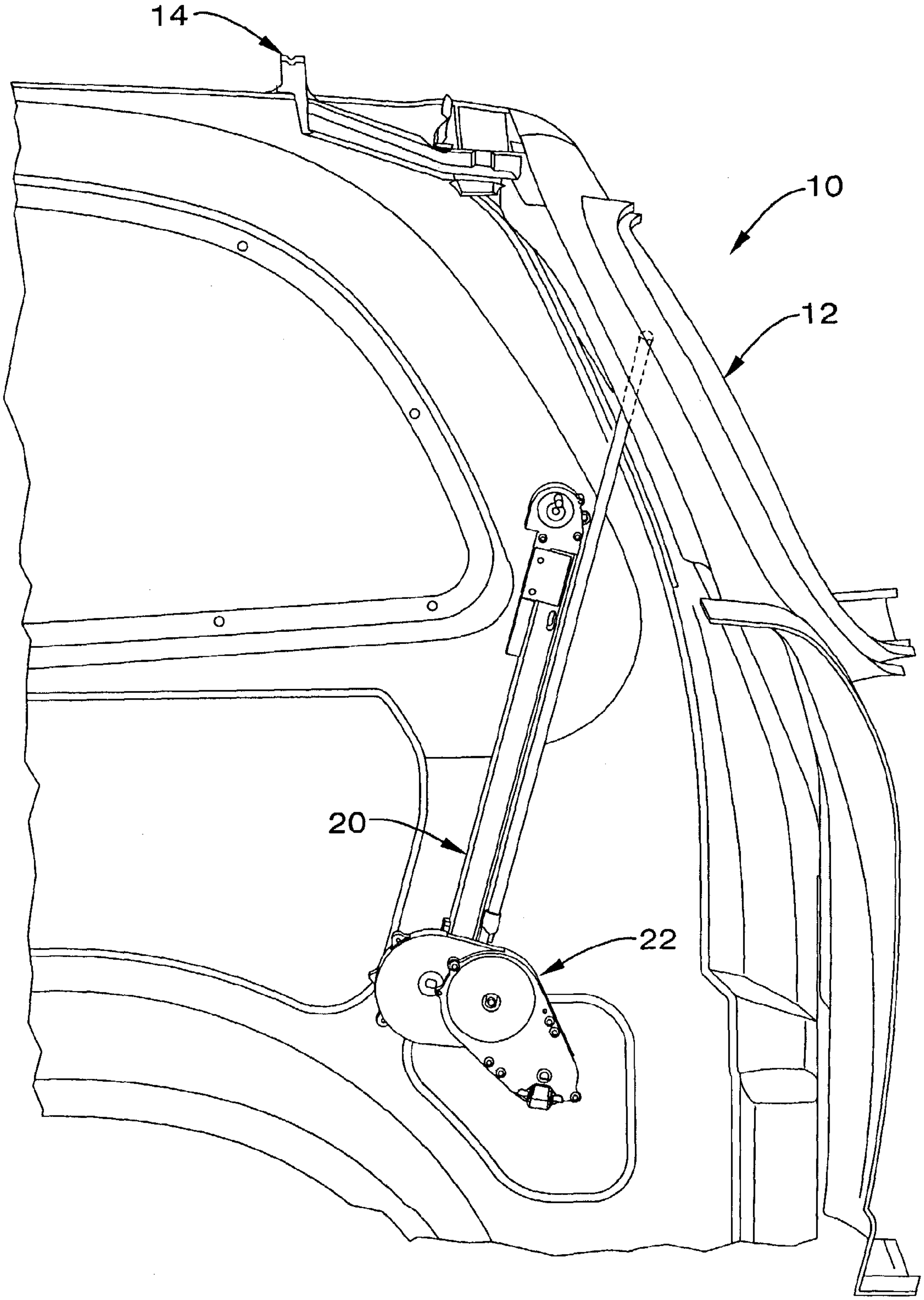
FIG. 1 is a partial side view of a motor vehicle having a power operated lift gate, shown closed, that is opened and closed by a drive unit of the invention.
Figure 2:
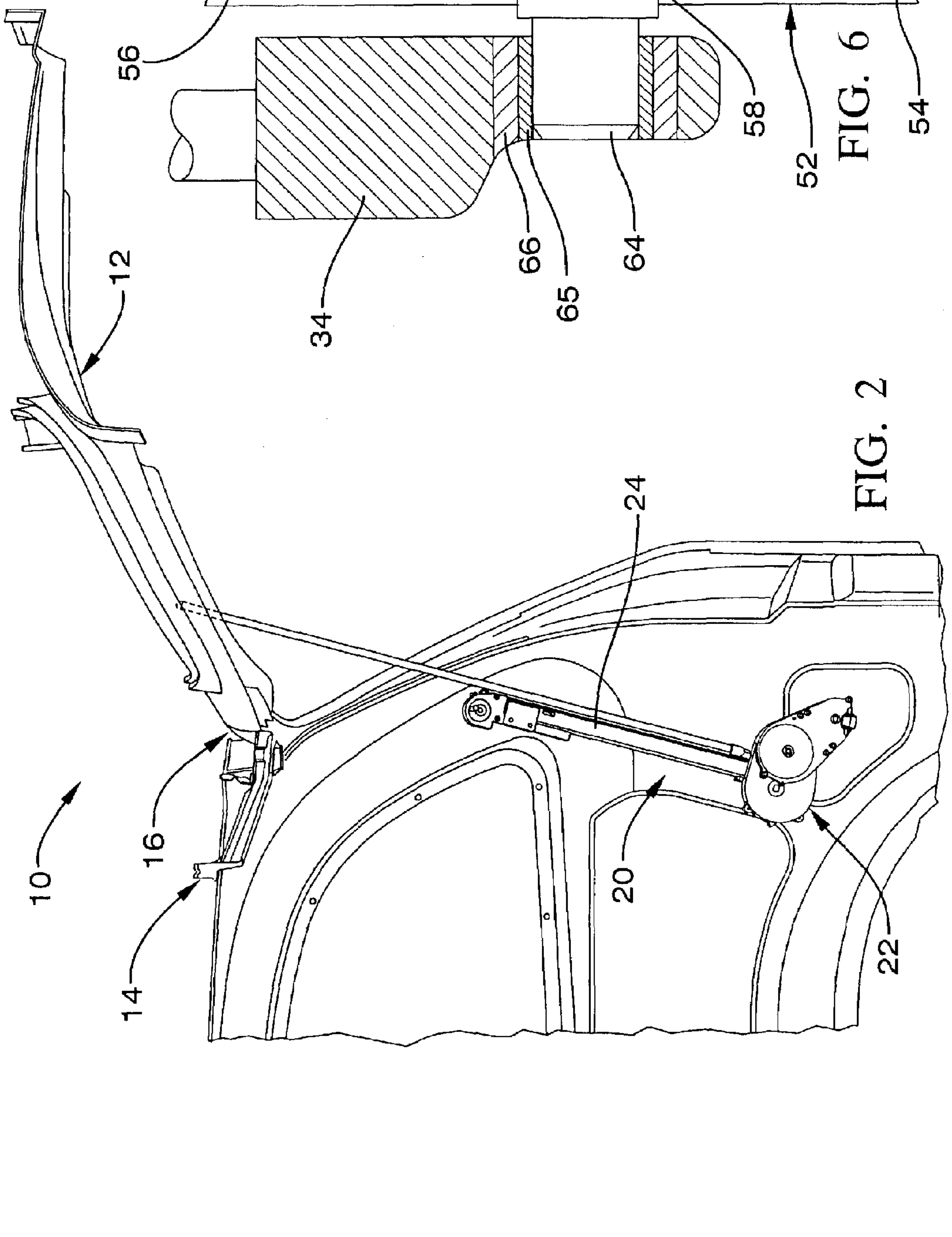
FIG. 2 is a partial side view of the motor vehicle of FIG. 1 showing the lift gate open.
Figure 3:
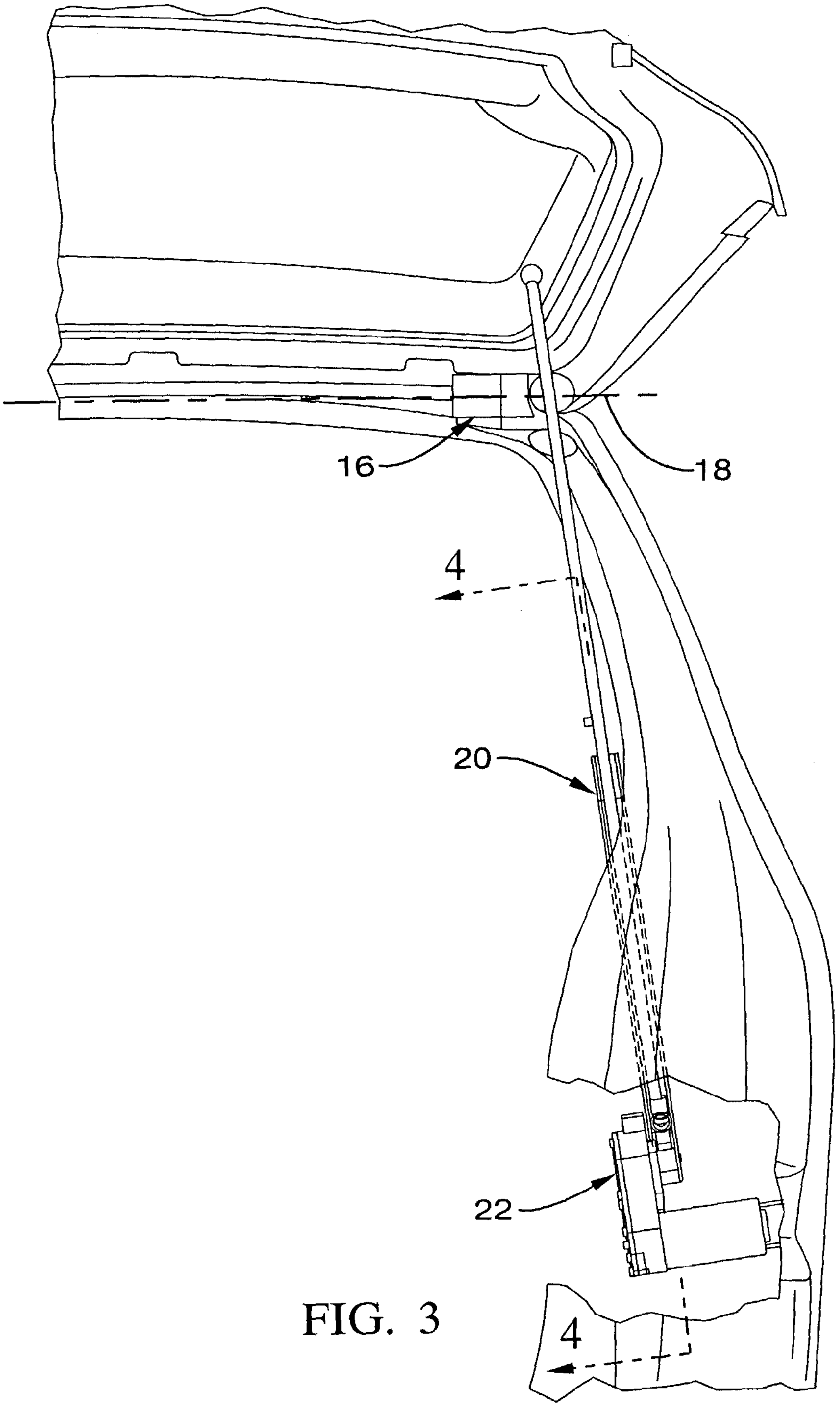
FIG. 3 is a partial rear view of the motor vehicle of FIG. 2.

Referring now to the drawings, vehicle 10 has a lift gate 12 that is attached to the aft end of the vehicle roof 14 by two hinge assemblies 16 so that lift gate 12 pivots about a substantially horizontal hinge axis 18 between a closed position shown in FIG. 1 and an open position shown in FIGS. 2 and 3. Lift gate 12 is generally permitted to pivot about 90 degrees about hinge axis 18. However, the range of movement can be varied substantially from one model of vehicle to another.

Lift gate 12 is power operated between opened and closed positions by a drive unit indicated generally at 20. Drive unit 20 comprises a motor assembly 22, a track 24, a guide 26, a drive wheel or sprocket 28, an idler wheel or sprocket 30, a drive member 32 and a drive link 34 as best shown in FIG. 4.

Figure 5:
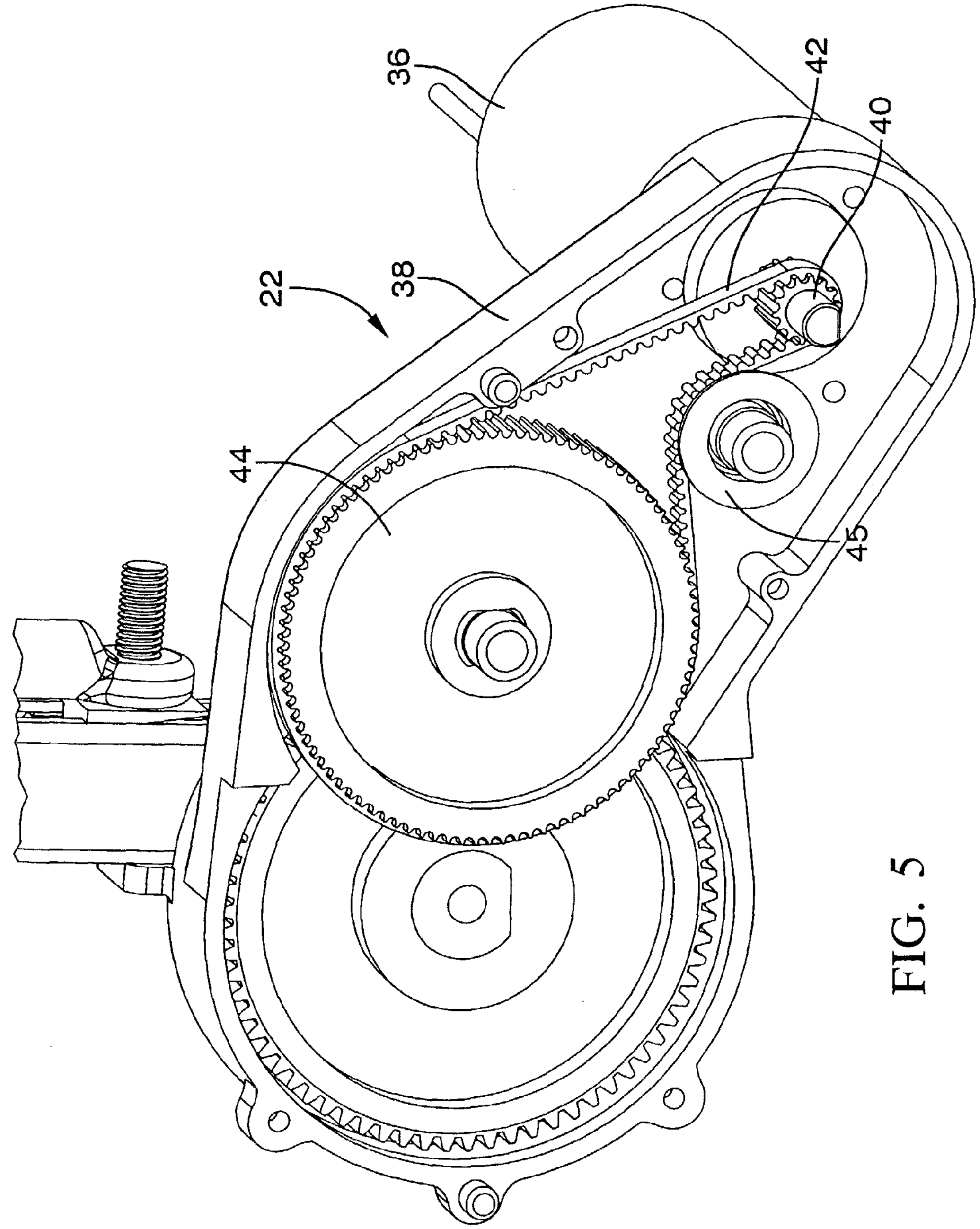
FIG. 5 is a perspective view of a motor assembly that is part of the drive unit shown in FIG. 4.

Motor assembly 22 is designed for quiet operation. More specifically in reference to FIGS. 5 and 6, motor assembly 22 comprises an electric motor 36 attached to a gear housing 38 that has a cover. The cover is removed in FIG. 5 to show the details of a gear train that reduces speed in two stages. The first stage is belt driven. In this first stage, electric motor 36 drives an output sprocket 40 that drives a cogged (toothed) belt 42, that is turn drives a cogged wheel 44. The outer surface of belt 42 may be engaged by an optional spring biased idler wheel 45 that takes up any slack in belt 42. This belt driven first speed reduction stage has several advantages in comparison to meshing gears. The belt drive has a high power transmission efficiency, usually on the order of 95% or better while being considerably quieter than meshing gears which must reduce the motor output speed which is typically on the order of 3000 rpm or higher. The belt driven first reduction stage permits the motor output speed to be reduced to 1000 rpm or lower in a quiet efficient manner. This in turn permits the further speed reduction by spur gears which are relatively inexpensive and which operate quietly at 1000 rpm or less.

Having reduced the speed to cogged wheel 44 to the 1000 rpm level or lower, a second speed reduction stage using meshing spur gears is possible while retaining the desired quiet operation. Thus, cogged wheel 44 turns a concentric spur gear 46 that is preferably integrally connected to cogged wheel 44. Spur gear 46 meshes with and drives a large spur gear 48 for a second stage speed reduction to an operating speed of about 30 rpm as best shown in FIG. 4. Spur gear 48 is drivingly connected to drive sprocket 28 by a shaft 50 that extends through a back wall of gear housing 38.

Figure 6:
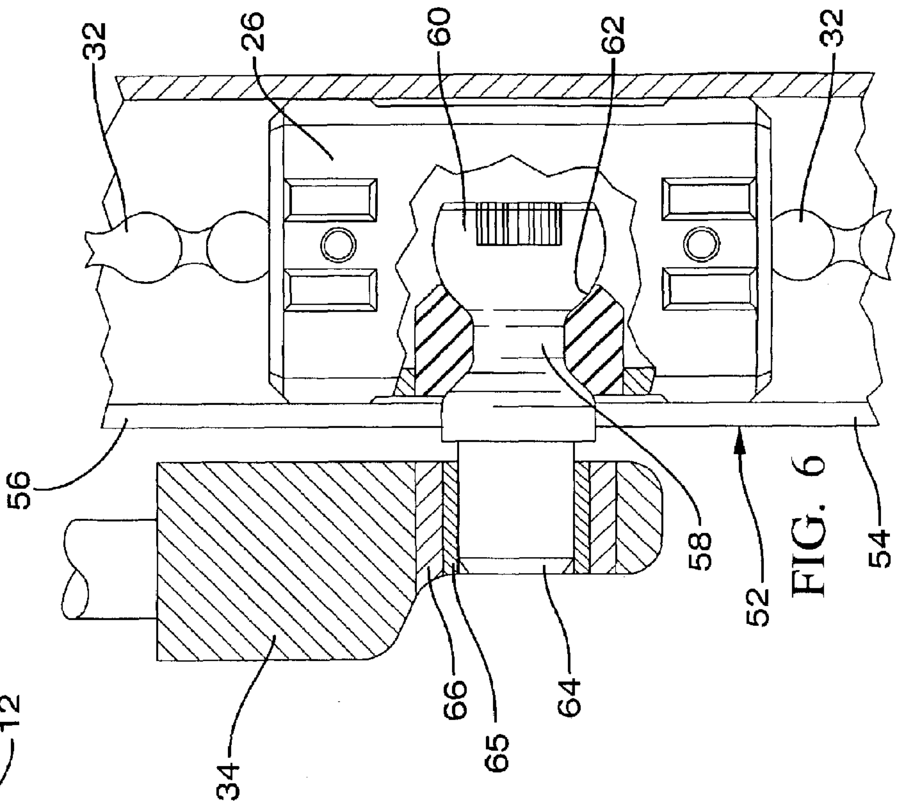
FIG. 6 is an enlargement of a portion of FIG. 4.
Figure 4:
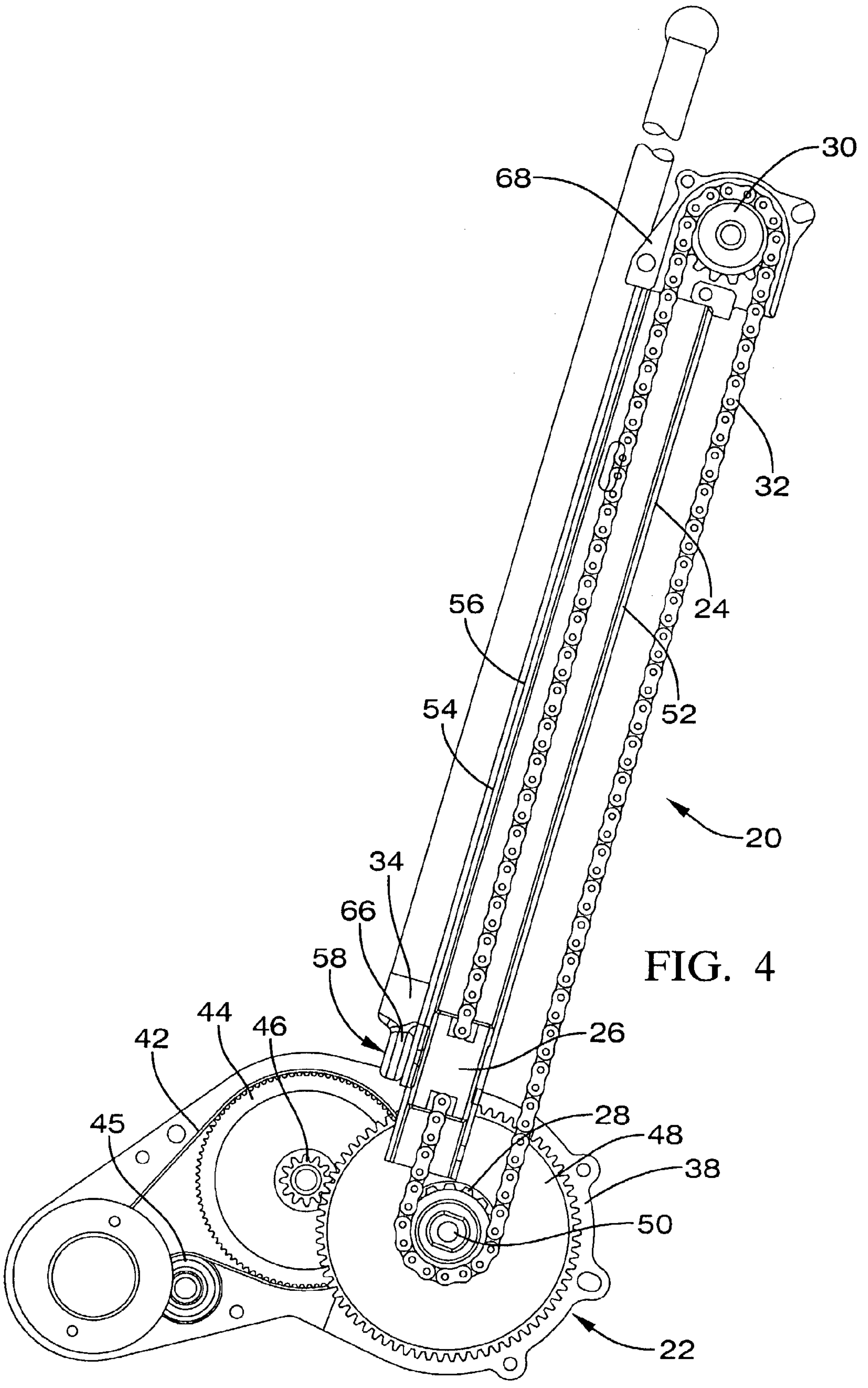
FIG. 4 is a side view of the drive unit taken substantially along the line 4-4 of FIG. 3 looking in the direction of the arrows.

Gear housing 38 is attached to the bottom of track 24 as best shown in FIG. 4. Track 24 is a square shaped channel 52 that has a slot 54 in one side wall, preferably the side wall 56 that faces rearward. Guide 26 travels in channel 52 and is connected to the bottom of drive link 34 by a connector 58 that extends through slot 54 as best shown in FIGS. 4 and 6. Connector 58 has a ball 60 at one end that is pivots in a spherical seat 62 of guide 26. The opposite end of connector 58 is a pivot pin 64 that rotates in a cylindrical bearing 65 in an attachment piece 66 at the lower end of drive link 34.

Gear housing 38 is attached to the bottom of track 24 so that about one-half of the opening at the bottom of channel 52 is aligned with about one-half of the sprocket 28 as best shown in FIG. 4. An idler housing 68 is attached to the top of track 24 to rotatably support idler sprocket 30. Idler housing 68 has a lower opening aligned with channel 52. The drive member 32 is a chain that is wrapped around drive sprocket 28 and idler sprocket 30 with its ends projecting into channel 52 and attached to upper and lower ends of guide 26 respectively. Alternatively drive member 32 can be an endless cogged belt and either may simply be connected to guide 26 midway between the ends of guide 26. In either event the attachment of the drive member 32 to the guide 26 is directly in line with the attachment of the drive link 34 to the guide 26 as best shown in FIG. 4. This attachment arrangement substantially reduces and practically eliminates any twisting force or torque on the guide 26 that would cause the guide 26 to engage the channel 52 and act like a brake. The upper end of drive link 34 is attached to lift gate 12 by a pivot pin (not shown).

This attachment arrangement at the lower end of drive link 34 and the belt driven speed reduction stage results in a relatively small gear housing 38 and better overall packaging of the drive unit 20. The drive unit 20 is also back driveable when the lift gate is opened or closed manually because of the high overall efficiency of the gear train provided that electric motor 36 has a low back drive cogging torque.

Figure 7:
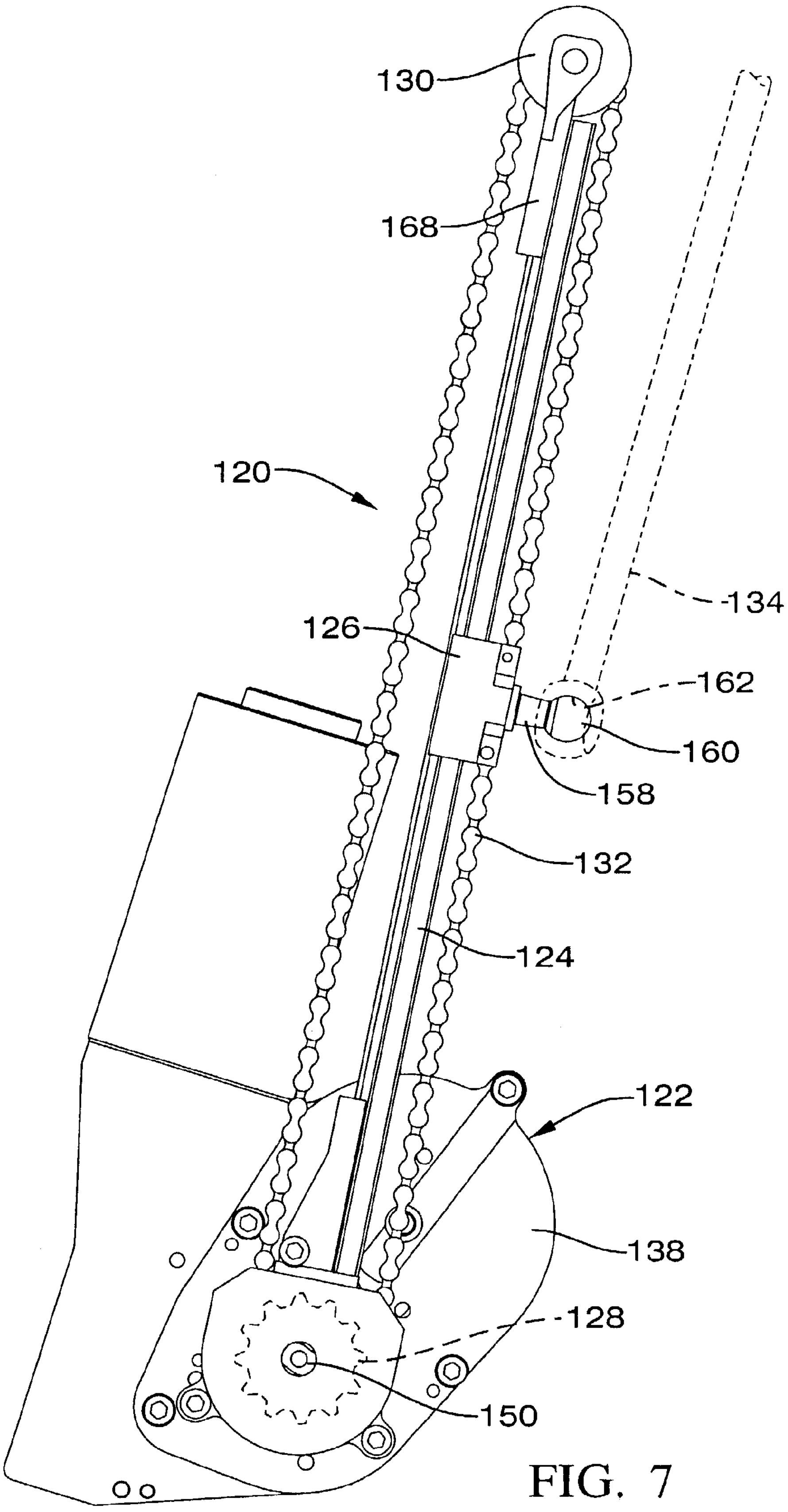
FIG. 7 is a side view of another drive unit of the invention.
Figure 8:
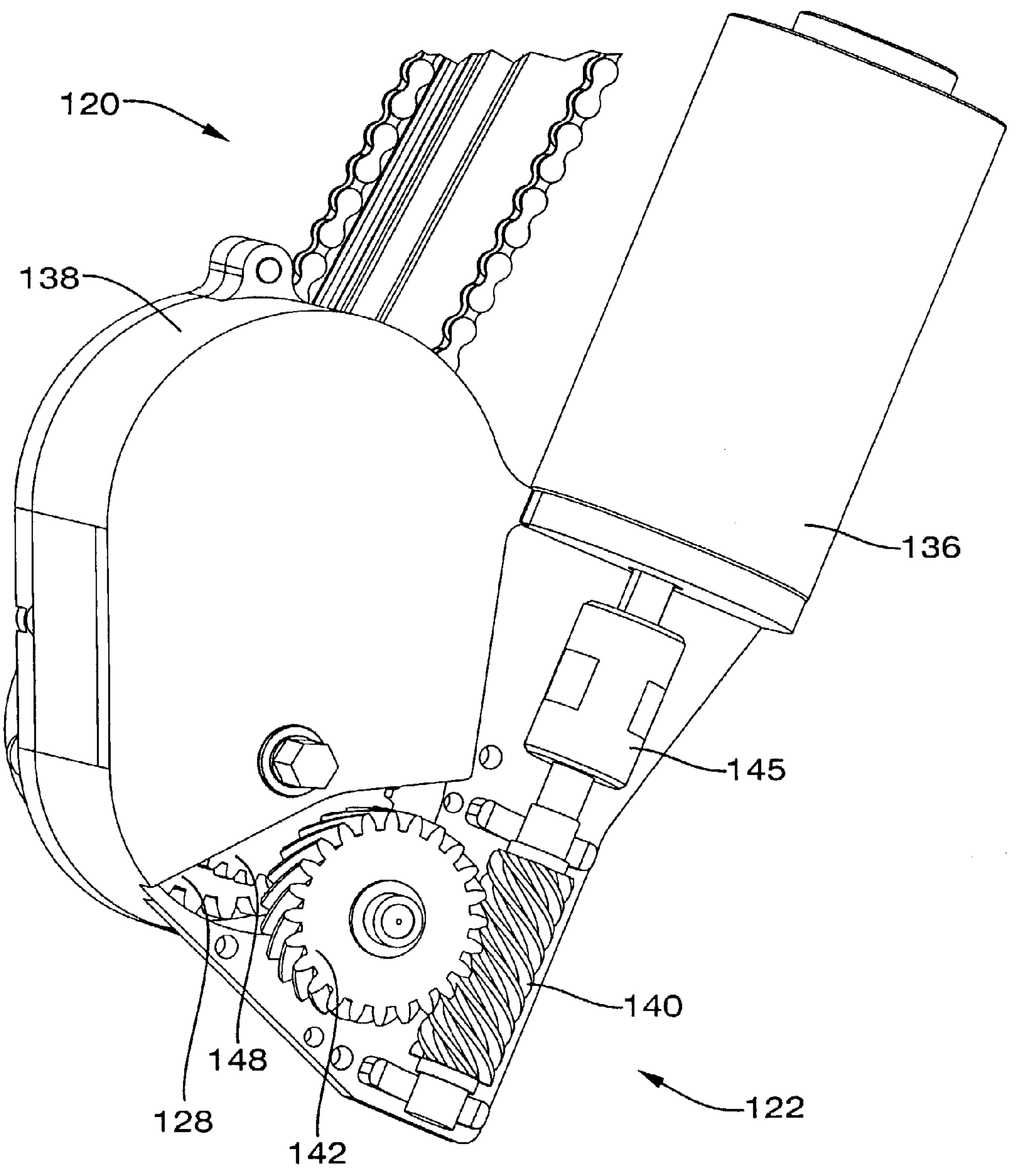
FIG. 8 is a perspective view of a motor assembly of the drive unit shown in FIG. 7.

Referring now to FIGS. 7 and 8, lift gate 12 shown in FIGS. 1, 2 and 3 may be power operated between opened and closed positions by an alternate drive unit of the invention indicated generally at 120. Drive unit 20 comprises a motor assembly 122, a track 124, a guide 126, a drive wheel or sprocket 128, an idler wheel or sprocket 130, a drive member 132 and a drive link 134.

Motor assembly 132 comprises an electric motor 136 attached to a gear housing 138 that has a cover that is partly cut-away in FIG. 8 to show the details of a gear train that reduces speed in two stages. The first stage is a worm gear set. In this first stage, electric motor 136 drives a worm gear 140 that drives a mating helical gear 142. Electric motor 136 preferably drives worm gear 140 via a flexible coupling 145 that takes up any misalignment between axis of the motor shaft and the axis of the worm gear 140. The worm gear 140 preferably has a high lead angle and a high number of leads, such as a lead angle of about 30 degrees to 35 degrees and 5 to 7 leads. This worm gear driven first speed reduction stage has several advantages in comparison to meshing spur gears. The worm gear drive has a high power transmission efficiency, usually on the order of 95% or better, while being considerably quieter than meshing gears which must reduce the motor output speed which is typically on the order of 3000 rpm or higher. The worm gear driven first reduction stage permits the motor output speed to be reduced to 1000 rpm or lower in a quiet efficient manner. For instance, by way of example, a worm gear that has 6 leads or starts with a lead angle of 33 degrees when driven at 3600 rpm drives a mating helical gear with 24 teeth at about 900 rpm. This in turn permits the further speed reduction by spur gears which are relatively inexpensive and which operate quietly at 1000 rpm or less. Moreover, the worm gear reduction is very compact.

Having reduced the speed of the helical gear 142 to the 1000 rpm level or lower, a second speed reduction stage using meshing spur gears is possible while retaining the desired quiet operation. Thus, the helical gear 142 turns a concentric spur gear (not shown) that is preferably integrally connected to helical gear 142 and that meshes with and drives a large spur gear 148 for a second stage speed reduction to an operating speed of about 30 rpm. Spur gear 148 is drivingly connected to drive sprocket 128 by a shaft 150.

Gear housing 138 is attached to the bottom of track 124 as best shown in FIG. 8. Track 124 is a rolled steel section. Guide 126 travels along track 124 and is connected to the bottom of drive link 134 by a connector 158. Connector 158 has a ball 160 at one end that is pivots in a spherical seat 162 of drive link 134.

Gear housing 138 is attached to the bottom of track 124 so that diametrically opposite peripheral portions of the sprocket 128 are located outwardly of the track 124. An idler support 168 is attached to the top of track 124 to rotatably support idler sprocket 130 so that diametrically opposite peripheral portions of the idler sprocket 130 are located outwardly of track 124. The drive member 132 is a chain that is wrapped around drive sprocket 128 and idler sprocket 130 with its ends attached to upper and lower ends of guide 126 respectively. Alternatively drive member 132 can be an endless cogged belt and either may simply be connected to guide 126 midway between the ends of guide 126. In either event the attachment of the drive member 132 to the guide 126 is preferably directly in line with the attachment of the drive link 134 to the guide 126 such as shown for the first embodiment and in FIG. 7. This attachment arrangement substantially reduces and practically eliminates any twisting force or torque on the guide 126 that would cause the guide 126 to engage the track 124 and act like a brake. The upper end of drive link 134 is attached to lift gate 12 by a pivot pin (not shown).

This attachment arrangement at the lower end of drive link 134 and the worm gear driven speed reduction stage results in a relatively small gear housing 138 and better overall packaging of the drive unit 120. The drive unit 120 is also back driveable when the lift gate is opened or closed manually because of the high overall efficiency of the modified gear train provided that electric motor 136 has a low back drive cogging torque.

Obviously, many modifications and variations of the present invention in light of the above teachings may be made. It is, therefore, to be understood that, within the scope of the appended claims, the invention may be practiced otherwise than as specifically described.

We claim:

1. A drive unit (20) for a power operated vehicle closure (12) comprising:

a track (24), a guide (26) engaging the track for sliding movement along the track, a link (34) attached to the guide at one end and adapted to be attached to the vehicle closure at the opposite end, and a motor assembly (22) including a housing attached to the track for moving the guide along the track, the motor assembly having an electric motor (36) and a speed reducer driven by the electric motor, the speed reducer having a first speed reducing stage (40, 42, 44) and a second speed reducing stage (46, 48) that is driven by the first speed reducing stage and that is drivingly connected to the guide for moving the guide along the track wherein the first stage includes a belt drive (40, 42, 44) and wherein the second stage is a spur gear set 46, 48).

2. A drive unit (20) for a power operated vehicle closure (12) comprising:

a track (24), a guide (26) engaging the track for sliding movement along the track, a link (34) attached to the guide at one end and adapted to be attached to the vehicle closure at the opposite end, and a motor assembly (22) including a housing attached to an end of the track for moving the guide along the track, the motor assembly having an electric motor (36) and a speed reducer driven by the electric motor, the speed reducer having a first speed reducing stage (40, 42, 44) and a second speed reducing stage (46, 48), the first stage including a worm gear (140) and a mating helical gear (142), the second stage being a spur gear set (46, 48) that is driven by the first speed reducing stage and that is drivingly connected to the guide for moving the guide along the track, and wherein the worm gear (140) has a lead angle in the range of about 30 degrees to 35 degrees and five to seven leads.

3. A drive unit (20) for a power operated vehicle closure (12) comprising:

a track (24), a guide (26) in sliding engagement with the track, an endless drive member (32, 132) associated with the track (24) and the guide (26) for sliding the guide along the track, a link (34) attached to the guide at one end and adapted to be attached to the vehicle closure at the opposite end, and a motor assembly (22) having a housing attached to an end of the track for -sliding the guide along the track, the motor assembly having an electric motor (36) and a speed reducer driven by the electric motor, the speed reducer having a first speed reducing stage (40, 42, 44) and a second speed reducing stage (46, 48), the first stage including a worm gear (140) and a mating helical gear (142), the second stage being a spur gear set (46, 48) that is driven by the first reducing stage and that drives the endless drive member, and wherein the worm gear (140) has a lead angle in the range of about 30 degrees to 35 degrees and five to seven leads.

4. The drive unit as defined in claim 1 further including an endless drive member (32) associated with the track (24) and the guide (26) for sliding the guide along the track.

* * * * *